United States Patent
Liao et al.

(10) Patent No.: US 11,170,147 B2
(45) Date of Patent: Nov. 9, 2021

(54) SIMULATION METHOD FOR USE IN FUNCTIONAL EQUIVALENCE CHECK

(71) Applicant: Yangtze Memory Technologies Co., Ltd., Wuhan (CN)

(72) Inventors: Lu Liao, Wuhan (CN); Mei Wang, Wuhan (CN); Yueping Li, Wuhan (CN)

(73) Assignee: Yangtze Memory Technologies Co., Ltd., Wuhan (CN)

(*) Notice: Subject to any disclaimer, the term of this patent is extended or adjusted under 35 U.S.C. 154(b) by 67 days.

(21) Appl. No.: 16/544,928

(22) Filed: Aug. 20, 2019

(65) Prior Publication Data
US 2020/0356639 A1    Nov. 12, 2020

Related U.S. Application Data

(63) Continuation of application No. PCT/CN2019/086177, filed on May 9, 2019.

(51) Int. Cl.
*G06F 30/367* (2020.01)
*G06F 30/3323* (2020.01)
*G06F 30/327* (2020.01)
*G06F 30/38* (2020.01)

(52) U.S. Cl.
CPC .......... *G06F 30/367* (2020.01); *G06F 30/327* (2020.01); *G06F 30/3323* (2020.01); *G06F 30/38* (2020.01)

(58) Field of Classification Search
CPC .. G06F 30/367; G06F 30/3323; G06F 30/327; G06F 30/38
USPC ................. 716/106, 107, 111, 136; 703/16
See application file for complete search history.

(56) References Cited

U.S. PATENT DOCUMENTS

| | | | |
|---|---|---|---|
| 5,452,227 A | 9/1995 | Kelsey | |
| 5,572,437 A | 11/1996 | Rostoker | |
| 5,701,443 A * | 12/1997 | Oguma | G06F 30/33 703/15 |

(Continued)

FOREIGN PATENT DOCUMENTS

| | | |
|---|---|---|
| CN | 101425857 A | 5/2009 |
| CN | 101714184 A | 5/2010 |

(Continued)

OTHER PUBLICATIONS

Cleaveland et al., "Equivalence and Preorder Checking for Finite-State Systems", 2001, Elsevier Science B.V., pp. 391-424. (Year: 2001).*

(Continued)

*Primary Examiner* — Phallaka Kik
(74) *Attorney, Agent, or Firm* — Winston Hsu

(57) ABSTRACT

A function equivalence check method includes receiving a cell list, receiving an analog constraint of a cell in the cell list, generating the full-coverage input stimuli according to the analog constraint, performing a behavioral-level simulation using the full-coverage input stimuli and according to the behavioral code to generate a behavioral-level simulation result, performing a circuit-level simulation using the full-coverage input stimuli and according to the circuit-level netlist to generate a circuit-level simulation result, and comparing the behavioral-level simulation result and the circuit-level simulation result to generate a comparison report for an analog value auto-comparison.

20 Claims, 11 Drawing Sheets

(56) References Cited

U.S. PATENT DOCUMENTS

| | | | | |
|---|---|---|---|---|
| 5,841,967 | A * | 11/1998 | Sample | G06F 30/331 |
| | | | | 714/33 |
| 6,212,490 | B1 * | 4/2001 | Li | G06F 30/367 |
| | | | | 703/14 |
| 6,523,153 | B1 * | 2/2003 | Takemura | G06F 30/33 |
| | | | | 716/103 |
| 7,328,195 | B2 * | 2/2008 | Willis | G06F 30/367 |
| | | | | 706/14 |
| 10,133,837 | B1 * | 11/2018 | Turbovich | G06F 30/3323 |
| 2002/0188915 | A1 * | 12/2002 | Hayes | G06F 30/367 |
| | | | | 716/113 |
| 2003/0131324 | A1 * | 7/2003 | Takenaka | G06F 30/3323 |
| | | | | 716/103 |
| 2003/0154061 | A1 * | 8/2003 | Willis | G06F 30/367 |
| | | | | 703/4 |
| 2004/0254775 | A1 * | 12/2004 | Muranyi | G06F 30/367 |
| | | | | 703/16 |
| 2005/0102596 | A1 | 5/2005 | Hekmatpour | |
| 2011/0054875 | A1 * | 3/2011 | Chang | G06F 30/367 |
| | | | | 703/14 |
| 2011/0066988 | A1 | 3/2011 | Habermann | |
| 2011/0161760 | A1 * | 6/2011 | Bansal | G01R 31/3177 |
| | | | | 714/733 |
| 2013/0263072 | A1 * | 10/2013 | Reddy | G06F 30/36 |
| | | | | 716/107 |
| 2013/0338991 | A1 * | 12/2013 | Lin | G06F 30/398 |
| | | | | 703/14 |
| 2015/0161379 | A1 * | 6/2015 | Korman | G06F 21/87 |
| | | | | 726/1 |
| 2015/0227664 | A1 * | 8/2015 | Shepherd | G06F 30/3323 |
| | | | | 716/132 |
| 2015/0347666 | A1 * | 12/2015 | Zhang | G06F 17/16 |
| | | | | 716/109 |
| 2016/0110483 | A1 | 4/2016 | Koo | |
| 2017/0011138 | A1 * | 1/2017 | Venkatesh | G06F 30/327 |

FOREIGN PATENT DOCUMENTS

| | | |
|---|---|---|
| CN | 102033990 A | 4/2011 |
| CN | 106817215 A | 6/2017 |
| CN | 108875192 A | 11/2018 |
| CN | 109086468 A | 12/2018 |
| CN | 109190210 A | 1/2019 |
| CN | 109684746 A | 4/2019 |
| TW | 464828 | 11/2001 |
| TW | 530360 | 5/2003 |
| TW | 200620018 | 6/2006 |
| TW | 200634904 | 10/2006 |
| TW | 200724952 | 7/2007 |
| TW | 200739111 | 10/2007 |
| TW | 201005566 | 2/2010 |
| TW | 201106186 A1 | 2/2011 |
| TW | 201145058 A1 | 12/2011 |
| TW | 201209430 A1 | 3/2012 |
| TW | 201525743 A | 7/2015 |
| TW | 201807424 A | 3/2018 |
| TW | 201820184 A | 6/2018 |

OTHER PUBLICATIONS

Thaker, "Register-Transfer Level Fault Modeling and Test Evaluation Technique for VLSI Circuits", The Department of Electrical and Computer Engineering of the George Washing University, May 21, 2000, 126 pages. (Year: 2000).*

Villar et al., "System Specificaftion & Design Languages", Kluwer Academic Publishers, 2004, 336 pages. (Year: 2004).*

Wang Zhiming, The Design of Sigma-Delta Modulator Based on Mash Structure, Dissertation for the Master Degree in Engineering, Harbin University of Science and Technology, Mar. 31, 2014, coverpages & p. 1-46.

Liao Lu et al., "Automatic simulation method for functional equivalence check", Application of Electronic Technique, vol. 45, No. 8, Aug. 6, 2019, p. 63-67.

Cai Weihua, "Behavior-level Modeling and Simulation of Pipeline ADC", Jul. 16, 2012, pp. 9-11, 36-43, Master Thesis of Hangzhou Dianzi University, Chinese Master's Theses Full-text Database, Information Science and Technology, Issue 08, English abstract.

Wang Zhiming, "The Design of Sigma-Delta Modulator Based on MASH Structure", Mar. 2014, Master Thesis of Harbin University of Science and Technology, Chinese Master's Theses Full-text Database, Information Science and Technology, Issue 7, English abstract.

* cited by examiner

```
Radix 1 1 1 1 1 1
Vname ph1 d q qb q_real
Sig_type lIIr
Io I I o o o
tunit 10ns
chk window 5 5 steady=0 period=100 first=50 duration=2 reltol=0.1 abstol=0.01
Vih 2.2
Vil 0
Voh 2.1
Vol 0.1

```
Radix 1 1 1 1 1
Vname ph1 d q qb q_real
Io I I o o o
tunit 10ns
chk window 5 5 steady=0 period=100 first=50
Vih 2.2
Vil 0
Voh 2.1
Vol 0.1

SIMULATION METHOD FOR USE IN FUNCTIONAL EQUIVALENCE CHECK

CROSS REFERENCE TO RELATED APPLICATIONS

This is a continuation of PCT patent application No. PCT/CN2019/086177, filed on 9 May 2019, and included herein by reference in its entirety.

BACKGROUND OF THE INVENTION

1. Field of the Invention

The disclosure relates to computer aided design of electronic circuits, and in particularly, to a simulation method for use in functional equivalence checks.

2. Description of the Prior Art

A design flow for designing and fabricating integrated circuits typically involves many stages. Initially, transistor-level circuits are designed and circuit-level simulations are performed thereon to meet a specification. Later, a behavioral-level simulation for full-chip analog and/or mixed signal circuits is performed using behavior code in hardware description languages (HDL) such as very high-speed integrated circuit HDL (VHDL) or Verilog HDL. In the circuit-level simulation, the circuit is described in terms of circuit schematics of transistors, capacitors, resistors and wires. In the behavioral-level simulation, the circuit is described in terms of behaviors of circuit inputs and outputs. The accuracy of the behavior code may affect accuracy, efficiency and coverage of the full-chip Verilog behavioral-level simulation. In order to ensure accuracy of the behavior code, it is required to perform the functional equivalence check between behavior code and circuit schematics. One form of the function equivalence check is comparing a simulation result of a behavior code to that of a transistor-level circuits. Electronic design automation (EDA) tools are often used to perform functional equivalence checks.

Conventionally, circuit designers manually create input stimuli to be used in a behavioral-level simulation based on engineering understanding of circuit design functionalities, and logic values are adopted in the behavioral-level modeling, resulting in incomplete coverage of input combinations and the lack of analog value checks in the simulation.

Therefore, a simulation method is required to automate a functional equivalence check process, provide full-coverage of input stimuli, and take analog values of a circuit designs into consideration in a behavioral-level modeling and simulation, and perform the an analog value auto-comparison between behavioral-level simulation and the circuit-level simulation.

SUMMARY OF THE INVENTION

In one aspect of the invention, a function equivalence check method includes receiving an analog design constraint of a cell in the cell list; according to the analog design constraint to generate a full-coverage input stimuli; performing a behavioral-level simulation according to the behavioral code using the full-coverage input stimuli to generate a behavioral-level simulation result; performing a circuit-level simulation according to the circuit-level netlist using the full-coverage input stimuli to generate a circuit-level simulation result; and comparing the behavioral-level simulation result and the circuit-level simulation result to generate a comparison report for an analog value auto-comparison.

In another aspect of the invention, a computer of performing a function equivalence check is provided. The computer comprises a processor configured to execute a computer program and a non-transitory computer-readable storage medium coupled to the processor and configured to store the executable computer program. The computer program comprises: an input module configured to receive a cell list and the analog design constraint of a cell in the cell list, and generate a full-coverage input stimuli according to the analog design constraint; a behavioral-level simulator configured to perform a behavioral-level simulation according to the behavioral code using the full-coverage input stimuli to generate a behavioral-level simulation result; and a circuit-level simulator configured to perform a circuit-level simulation according to the circuit-level netlist using the full-coverage input stimuli to generate a circuit-level simulation result, and compare the behavioral-level simulation result and the circuit-level simulation result to generate a comparison report for an analog value auto-comparison.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 shows exemplary behavioral-level simulation result file for real value auto compare generated by the equivalence check system in FIG. 1.

FIG. 8 shows an exemplary behavioral-level simulation result file for logic value auto compare generated by the equivalence check system in FIG. 1.

DETAILED DESCRIPTION

As used herein, the term "circuit-level design" refers to a circuit or a system expressed by electronic components and interconnections, and the term "circuit-level simulation" refers to a simulation of an analog waveform for all nodes of the circuit-level design. The circuit-level design and the circuit-level simulation may be described and simulated by a circuit-level netlist and a simulation program with integrated circuit emphasis (SPICE) simulator, respectively. The circuit-level netlist contains a list of electronic components in the circuit-level design and a list of nodes they are connected to, and may be a SPICE netlist. The SPICE simulator may be a FastSPICE tool such as Spectre XPS, FineSim-Pro, or CustomSim. The term "behavioral-level design" refers to a circuit or a system defined by behaviors of output responses in terms of input stimuli of the circuit or the system, and the term "behavioral-level simulation" refers to a simulation of a digital waveform for all nodes of the behavioral-level design. The behavioral-level design and the behavioral-level simulation may be modeled and simulated by hardware description languages (HDL) such as very high-speed integrated circuit HDL (VHDL) and Verilog HDL and a corresponding HDL simulator, respectively.

Figure 1:
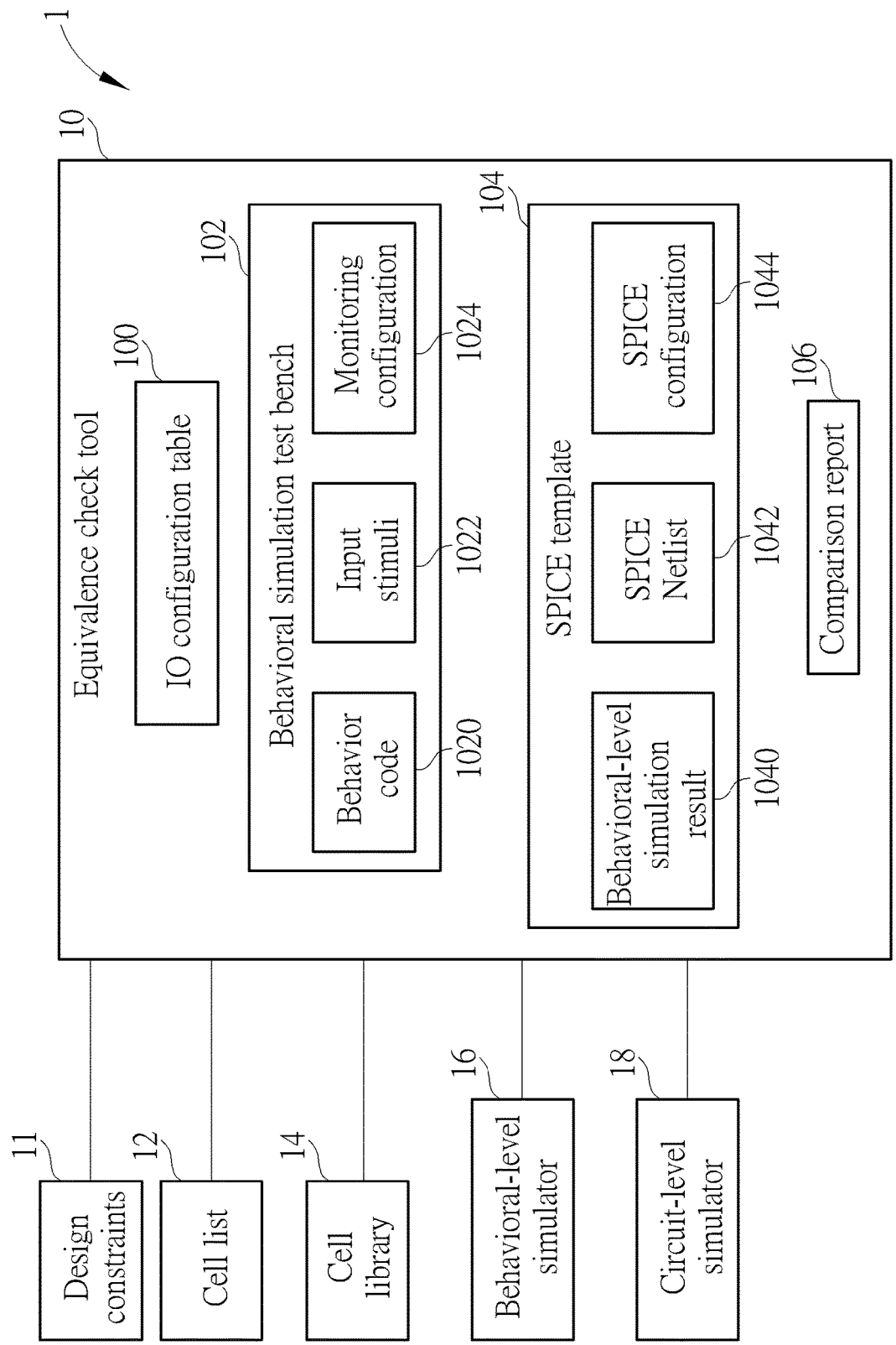
FIG. 1 is an equivalence check system according to an embodiment of the invention.

FIG. 1 is an equivalence check system 1 according to an embodiment of the invention. The equivalence check system 1 comprises an equivalence check tool 10, a cell list 12, a cell library 14, a behavioral-level simulator 16 and a circuit-level simulator 18. The equivalence check system 1 utilizes the equivalence check tool 10 to automate a functional equivalence check between a behavioral-level design and a circuit-level design for the analog and/or mixed signal cells in a full-chip circuit, generate the full-coverage input stimuli for the behavioral-level simulation and the circuit-level simulation, and perform the functional equivalence check using analog values of simulated outputs from the behavioral-level simulation and the circuit-level simulation. The cell list 12 may be extracted from a full-chip analog circuit or mixed-signal circuit. The cell library 14 may contain a collection of standard cells in behavior code formats and/or SPICE netlist formats for use in the full-chip circuit. The behavioral-level simulator 16 may be a Verilog simulator and the circuit-level simulator 18 may be a FastSPICE simulator.

The equivalence check tool 10 is coupled to the cell list 12, the cell library 14, the behavioral-level simulator 16 and the circuit-level simulator 18 to acquire the cell list 12, acquire required standard cells represented by behavior codes from the cell library 14, perform the behavioral-level simulation on the behavioral-level simulator 16, after that, acquire a SPICE netlist from the cell library 14, perform the circuit-level simulation on circuit-level simulator 18 and compare simulation results on the circuit-level simulator 18, and receive a comparison report from the circuit-level simulator 18. The equivalence check tool 10 comprises an input/output (IO) configuration table 100, a behavioral simulation test bench 102, a SPICE template 104 and a comparison report 106.

The IO configuration table 100 comprises a list of input pins and output pins of each cell in the cell list 12 and design constraints thereof, and may be generated according to the cell list 12 by an IO configuration table script and modified by a user input received from an input device such as a keyboard, a touchscreen, a microphone, or the like. The IO configuration table 100 may be used to generate the input stimuli and other configuration files for the behavioral-level simulation and the circuit-level simulation. The design constraints may be logic values or analog values. Tables 1 and 2 show embodiments of the IO configuration table 100 and respective include input stimulus constraints and output comparison constraints of input and output pins of a cell. Tables 1 and 2 may be combined to form one 10 configuration table.

TABLE 1

| Pin | IO | Port type | Real voltage | Vih | Vil | Forced input | Rest. input | Priority | Cycle (ns) | Unused pin | Power pin |
|---|---|---|---|---|---|---|---|---|---|---|---|
| en_vpe | I | | | | | M | | 1 | 100 | | |
| en_vpen | I | | | | | M | ~en_vpe | | | | |
| en_use1[2:0] | I | | | | | | | 2 | | | |
| pchr_n | I | | | | | 0 | | | | Yes | |
| out_vgsv[2:0] | O | | — | — | — | — | — | — | — | — | — |
| out_vpeh_1 | O | | — | — | — | — | — | — | — | — | — |
| out_test1 | O | | — | — | — | — | — | — | — | — | — |
| out_test2 | IO | O | — | — | — | — | — | — | — | — | — |
| vgsw | IO | I | Yes | 15 | | M | | 3 | | | |
| vpeh | IO | I | Yes | 20 | | M | | | | | |
| v2x | IO | I | Yes | 3.6 | | 1 | | | | | Yes |
| vdd | IO | I | Yes | | | 1 | | | | | Yes |
| vssx | IO | I | | | | 0 | | | | | Yes |
| vss | IO | I | | | | 0 | | | | | Yes |

TABLE 2

| Pin | IO | Port type | Real voltage | Voh | Vol | Unused pin | Output load | "Z" state check | "X" state check | SIM accuracy |
|---|---|---|---|---|---|---|---|---|---|---|
| en_vpe | I | | — | — | — | — | — | — | — | — |
| en_vpen | I | | — | — | — | — | — | — | — | — |
| en_use1[2:0] | I | | — | — | — | — | — | — | — | — |
| pchr_n | I | | — | — | — | — | — | — | — | — |
| out_vgsv[2:0] | O | | Yes | 14 | 0.7 | | 1f | Yes | Yes | 7 |
| out_vpeh_1 | O | | Yes | 19 | 0.7 | | | | | |
| out_test1 | O | | | | | Yes | | | | |
| out_test2 | IO | O | | | | Yes | | | | |
| vgsw | IO | I | — | — | — | — | — | — | — | — |
| vpeh | IO | I | — | — | — | — | — | — | — | — |
| v2x | IO | I | — | — | — | — | — | — | — | — |

TABLE 2-continued

| Pin | IO | Port type | Real voltage | Voh | Vol | Unused pin | Output load | "Z" state check | "X" state check | SIM accuracy |
|---|---|---|---|---|---|---|---|---|---|---|
| vdd | IO | I | — | — | — | — | — | — | — | — |
| vssx | IO | I | — | — | — | — | — | — | — | — |
| vss | IO | I | — | — | — | — | — | — | — | — |

Table 1 shows the constraint of each pin of a selected cell when the pin is utilized as an input pin. The constraint of the pin comprises an IO type, a port type, a real voltage, an input HIGH threshold voltage Vih, an input LOW threshold voltage Vil, a forced input, a restrictive input, priority, a cycle, an unused pin and a power pin. Table 2 shows the constraint of each pin of a selected cell when the pin is utilized as an output pin. The constraint of the pin comprises an IO type, a port type, a real voltage, an output HIGH threshold voltage Voh, an output LOW threshold voltage Vol, an unused pin, an output load, a "Z" state check, an "X" state check and simulation accuracy.

The IO type indicates that a pin is an input type, an output type, or an input/output type. The port type specifies that a port type of an input/output type of a pin is an input type or an output type, and is the same as the IO type of a pin for the input type or the output type of the pin. The real voltage for the input type specifies whether to employ an analog value as input stimulus with an input HIGH threshold voltage Vih, an input LOW threshold voltage Vil in the behavioral-level simulation; the real voltage for the output type specifies whether to perform a real value auto-comparison for an output with an output HIGH threshold voltage Voh or an output LOW threshold voltage Vol in the circuit-level simulation, if the real voltage for the output type is set to "Yes", the equivalence check tool 10 may apply both a logic value check and an analog value check to an output signal in a circuit-level simulation; and if the real voltage is set to "No", the equivalence check tool 10 may apply only a logic value check to the output signal in the circuit-level simulation. The Vih specifies an analog value of an input HIGH threshold voltage; the Vil specifies an analog value of an input LOW threshold voltage; the Voh specifies an analog value of an output HIGH threshold voltage; and the Vol specifies an analog value of an output LOW threshold voltage. If the real voltage is used, the Vih, Vil, Voh or Vol is the specified analog value when provided, and is a default analog value when not provided, with the default analog value being a supply voltage or a ground voltage. The forced input specifies whether to set an input signal of a specified pin to a logical value 1, a logical value 0, a multi-drive state or a floating state (respectively represented by "1", "0", "X", "Z"), or to alternate the input signal between the logical values 1 and 0 (represented by "m"). The restrictive input specifies dependency of an input signal of a pin on another input signal of another pin. For example, in Table 1, an input signal on pin en_vpen is dependent on the inverse of an input signal on Pin en_vpe. The priority specifies an order of a scan sequence, and in some embodiments, "1" represents the last input signal in a scan sequence, and the order of the input signals in the scan sequence can be arbitrary when the priorities thereof are not specified. For example, in Table 1, input signals on Pins en_vpe, en_use1[2:0], and vgsw are respectively the last, the second-to-last, and the third-to-last signals in a scan sequence, and the other input signals can be arranged in an arbitrary order in the scan sequence. The cycle specifies a duration of an input stimulus combination.

For example, in Table 1, an input stimulus will be injected to Pin en_vpe in an alternate manner for a duration of 100 ns. The unused pin and the power pin respectively specify a pin that is not in use and an input pin used to provide a voltage. For example, in Table 1, Pin pchr_n is not in use, and will be tied to a high impedance load and no function equivalence will be checked therefor, and Pins v2x, vdd, vssx, vss are used to provide voltages. The output load specifies an output load connected to an output pin. For example, in Table 2, Pins out_vgsv[2:0] have an output load of 1f. The "Z" state check and the "X" state check respectively specify whether to check for a multi-drive state and a floating state of a signal on an output pin in circuit-level simulation. For example, in Table 2, Pins out_vgsv[2:0] are checked for both the multi-drive state and floating state. The simulation accuracy specifies accuracy of the circuit-level simulation.

Despite not being shown, Table 1 and/or 2 may further include a check window field specifying a valid window in which simulation results of the behavioral-level simulation and the circuit-level simulation may be compared.

The behavioral simulation test bench 102 may be a Verilog test bench file used to set up a simulation environment for a Verilog simulation, and similarly, the SPICE template 104 may be an XPS template file for setting up a simulation environment for an XPS simulation and checking functional equivalence. The comparison report 106 is a report file describing functional equivalence of the output pins of each cell in the cell list 12 and is generated by the circuit-level simulator 18. The behavioral simulation test bench 102 comprises behavior code 1020, input stimuli 1022 and a monitoring configuration 1024. The SPICE template 104 comprises a behavioral-level simulation result 1040, a SPICE netlist 1042 and a SPICE configuration 1044. The behavior code 1020 and the SPICE netlist 1042 may be generated according to the cell list 12 and the cell library 14 by a behavior code script and a SPICE netlist script, respectively. The input stimuli 1022, the monitoring configuration 1024, and the SPICE configuration 1044 may be generated according to the IO configuration table 100 by an input stimulus script, a monitoring configuration script and a SPICE configuration script, respectively. The behavioral-level simulation result 1040 may be generated by the behavioral-level simulator 16, and may be a test.vec file which contains both of the input stimuli of all the input pins and the output values of all the output pins from behavioral-level simulation. The input stimuli 1022 contains full-coverage input combinations to be fed into input pins of cells. The monitoring configuration 1024 contains a list of input and output signals of cells to be captured. The SPICE configuration 1044 contains SPICE simulation parameters including simulation accuracy, a "Z" state check option and an "X" state check option.

Figure 2:
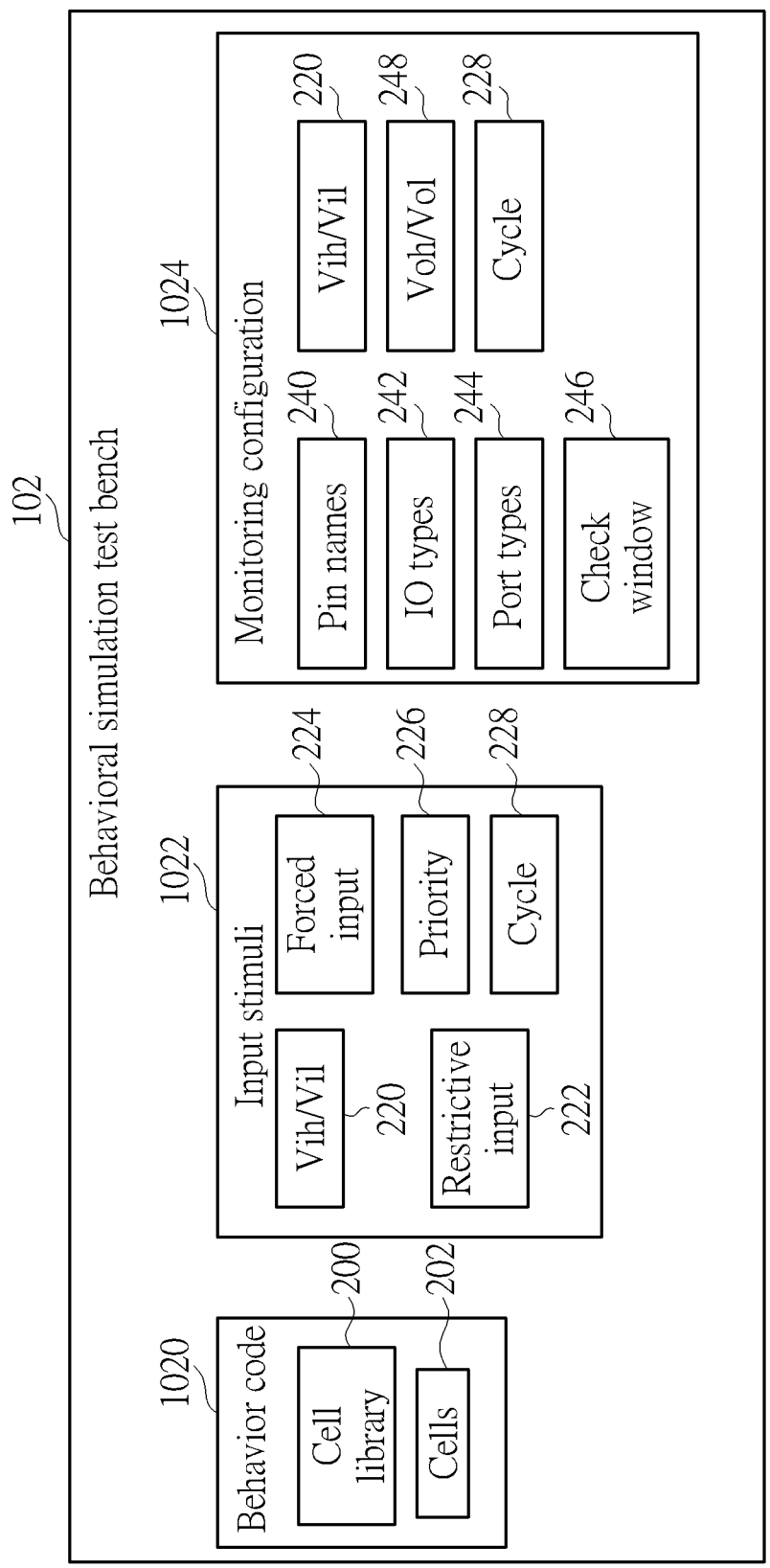
FIG. 2 is a behavioral simulation test bench adopted in the equivalence check system in FIG. 1.
Figure 3:
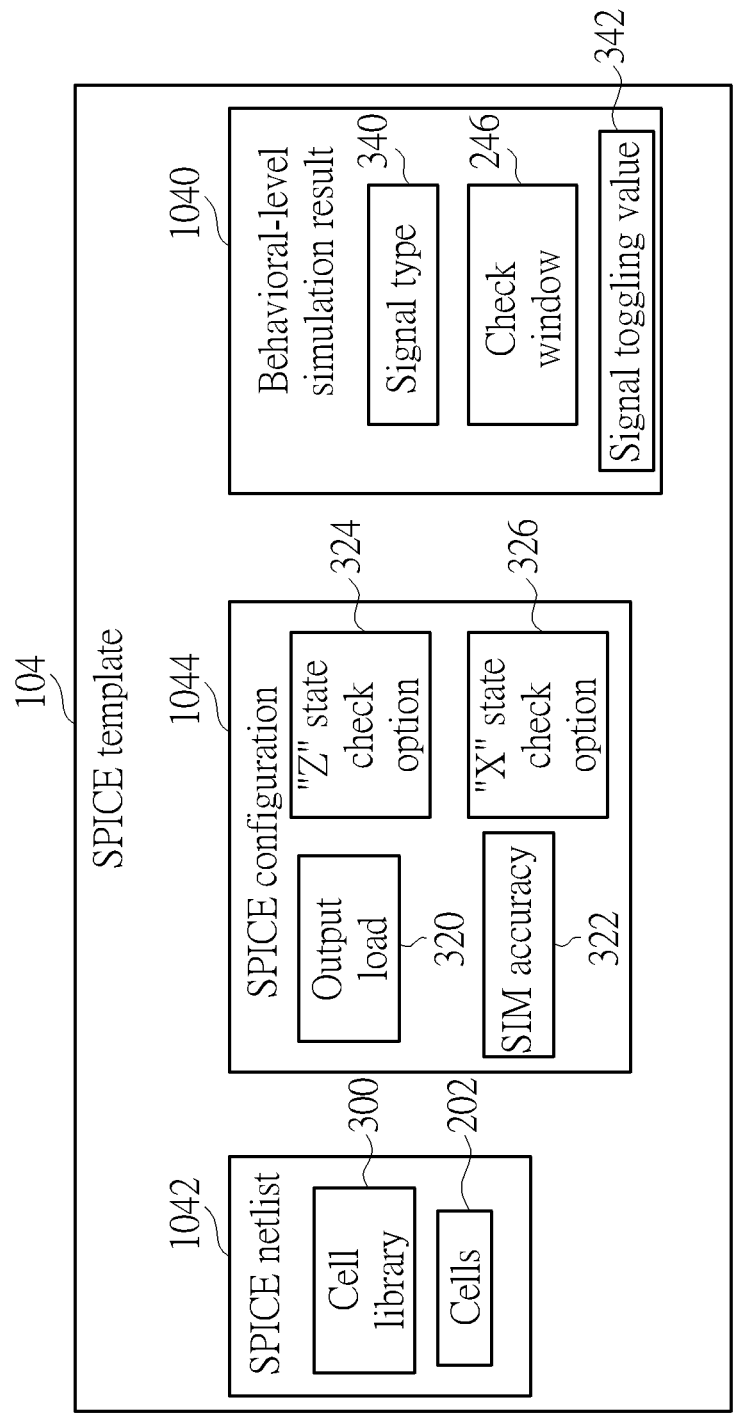
FIG. 3 is a SPICE template adopted in the equivalence check system in FIG. 1.

FIG. 2 is a behavioral simulation test bench 102 adopted in the equivalence check system 1, in which the behavior code 1020 comprises cells 202 and a cell library 200, the input stimuli 1022 are generated by Vih/Vil 220, a restrictive input 222, a forced input 224, a priority 226 and a cycle 228, and the monitoring configuration 1024 comprises pin names 240, IO types 242, port types 244, a check window 246, the Vih/Vil 220, Voh/Vol 248 and the cycle 228. FIG. 3 is a SPICE template 104 adopted in the equivalence check system 1, in which the behavioral-level simulation result 1040 comprises a signal type 340, a signal togging value 342 and the check window 246, the SPICE netlist 1042 comprises a cell library 300 and the cells 202, and the SPICE configuration 1044 comprises an output load 320, simulation accuracy 322, a "Z" state check option 324 and an "X" state check option 326.

Figure 4:
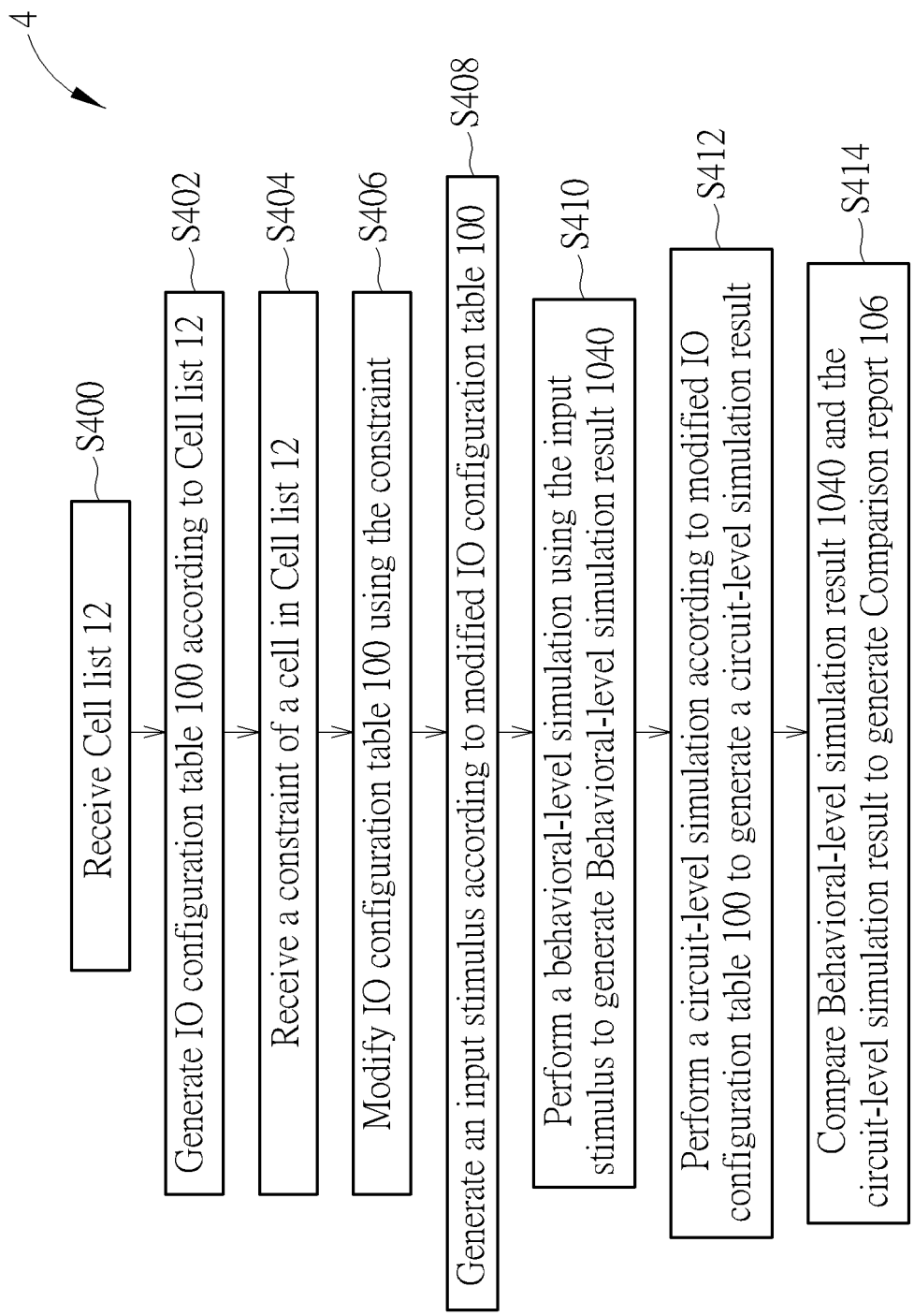
FIG. 4 is a flowchart of a simulation method adopted by the equivalence check system in FIG. 1.

FIG. 4 is a flowchart of a simulation method 4 adopted by the equivalence check system 1. The simulation method 4 comprises Steps S400 through S414 to automate a functional equivalence check. Steps S404 through S406 are used to generate the IO configuration table 100, and Steps S408 through S414 are used to check functional equivalence. Any reasonable technological change or step adjustment is within the scope of the disclosure. Steps S400 through S414 are detailed as below:

Step S400: Receive Cell list 12;
Step S402: Generate IO configuration table 100 according to Cell list 12;
Step S404: Receive a constraint of a cell in Cell list 12;
Step S406: Modify IO configuration table 100 using the constraint;
Step S408: Generate full-coverage input stimuli according to modified IO configuration table 100;
Step S410: Perform a behavioral-level simulation using the input stimulus to generate Behavioral-level simulation result 1040;
Step S412: Perform a circuit-level simulation according to modified IO configuration table 100 to generate a circuit-level simulation result;
Step S414: Compare Behavioral-level simulation result 1040 and the circuit-level simulation result to generate Comparison report 106.

The order of Steps is not limited to FIG. 4. In Step S400, the equivalence check tool 10 receives the cell list 12 of the full-chip analog or mixed-signal circuit, and in Step S402, the equivalence check tool 10 generates the IO configuration table 100 including pins of each cell in the cell list 12. A circuit designer may enter simulation constraints into the IO configuration table 100 to generate the input stimuli 1022 for input pins of each cell in the cell list 12. Specifically, the equivalence check tool 10 receives a constraint of a cell in the cell list 12 in Step S404, and modifies the IO configuration table 100 using the constraint by writing the constraint into the IO configuration table 100 in Step S406. The constraint may be a logic value or an analog value as in the discussion for Tables 1 and 2. Subsequently, in Step S408, the equivalence check tool 10 generates full-coverage input stimuli for each input pin of each cell according to the modified IO configuration table 100 to provide the input stimuli 1022. The equivalence check tool 10 may further extract the behavior code 1020 according to the cell list 12 and generate the monitoring configuration 1024 according to the IO configuration table 100. In Step S410, the behavioral-level simulator 16 performs a behavioral-level simulation using the input stimulus to generate the behavioral-level simulation result 1040 by applying the input stimulus to a cell modelled by the behaviour code to capture all the input signals and output signals specified in the monitor configuration and saving the captured input and output signals as the behavioral-level simulation result 1040. An example of the behavioral-level simulation result 1040 is provided in FIG. 6. In Step S412, the equivalence check tool 10 performs a circuit-level simulation according to the modified IO configuration table 100 and the behavioral-level simulation result 1040 to generate a circuit-level simulation result. Further, the equivalence check tool 10 extracts the SPICE netlist 1042 according to the cell list 12 and generates the SPICE configuration 1044 according to the modified IO configuration table 100, and the circuit-level simulator 18 performs the circuit-level simulation according to the behavioral-level simulation result 1040, the SPICE netlist 1042 and the SPICE configuration 1044 to generate the circuit-level simulation result. Specifically, the circuit-level simulator 18 may acquire input stimuli of the circuit-level simulation from the behavioral-level simulation result 1040, thereby maintaining consistency of input stimuli between the behavioral-level simulation and the circuit-level simulation. In Step S414, the circuit-level simulator 18 compares the behavioral-level simulation result 1040 and the circuit-level simulation result to generate the comparison report 106. The circuit-level simulator 18 may determine whether corresponding output signals from the behavioral-level simulation result 1040 and the circuit-level simulation result are consistent, if so, indicate in the comparison report 106 that output pins outputting the corresponding output signals are functionally equivalent, and if not, indicate in the comparison report 106 that the output pins are not functionally equivalent. In some embodiments, the circuit-level simulator 18 may compare the corresponding output signals in a check window, and details thereof will be discussed in FIG. 6. In other embodiments, the circuit-level simulator 18 may compare the corresponding output signals to check their equivalence by determining whether they are both in a Z-state or floating, if so, indicate in the comparison report 106 that a functional equivalence check of the output pin is successful, and if not, indicate in the comparison report 106 that a functional equivalence check of the output pin is failed. In yet other embodiments, the circuit-level simulator 18 may compare the corresponding output signals to check the equivalence by determining whether they are both in an X-state or multi-driven, if so, indicate in the comparison report 106 that a functional equivalence check of the output pin is successful, and if not, indicate in the comparison report 106 that a functional equivalence check of the output pin is failed. The comparison report 106 may contain functional equivalence check results of a list of output pins of each cell in the cell list 12.

Figure 5:
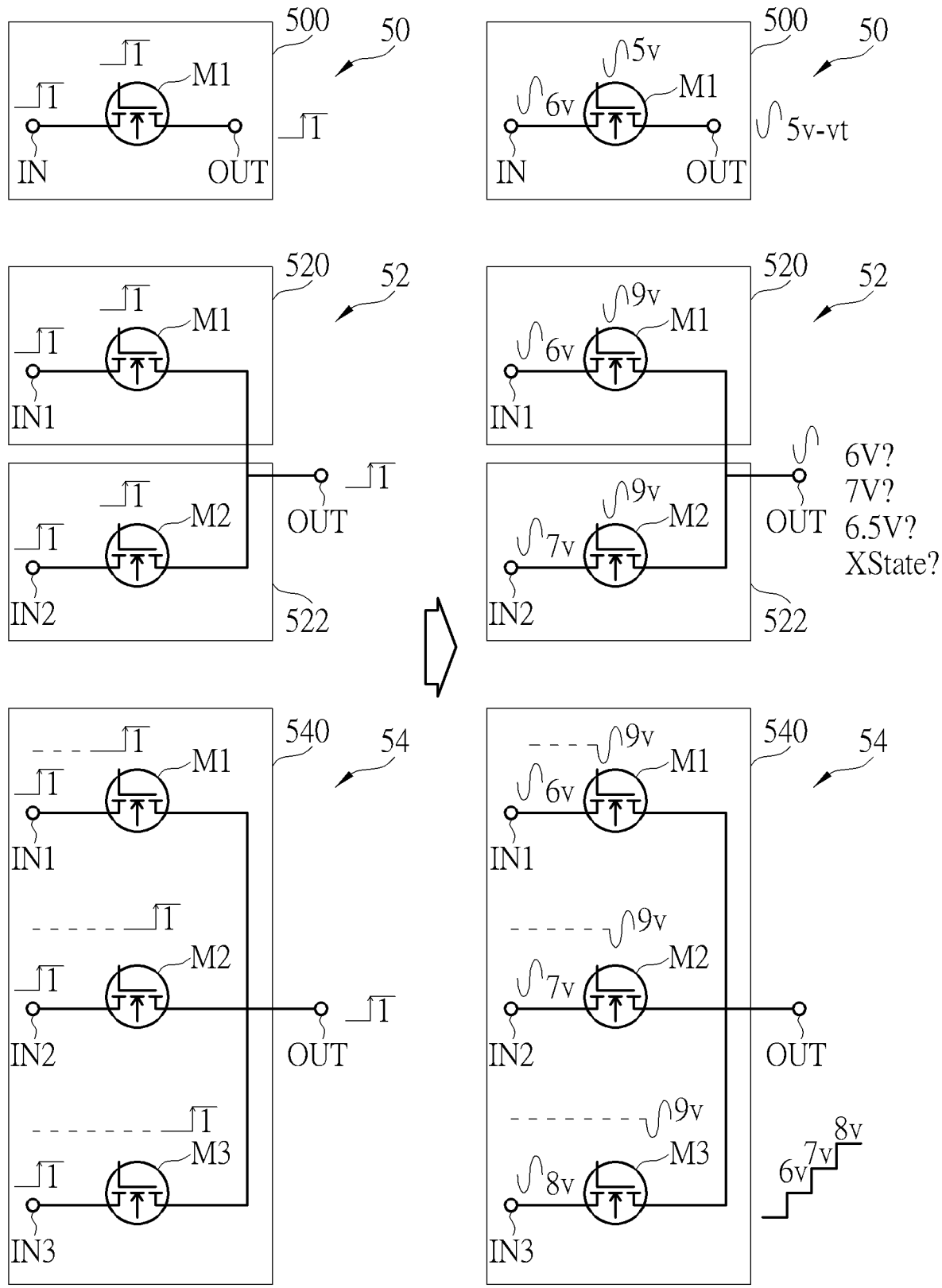
FIG. 5 shows three embodiments of behavioral-level simulations by applying analog constraints to the equivalence check system in FIG. 1.

FIG. 5 shows three embodiments of behavioral-level simulations by applying analog constraints to the equivalence check system 1, depicting benefits of adopting an analog value model in comparison to a logic state model. The analog value model is also referred to as a real value model. The cell list 12 may contain a single-transistor circuit 50, a multi-driven circuit 52 and a multi-driven circuit 54. The cell may be simulated using a logical constraint and/or an analog constraint. The analog constraint may be an input voltage limit of an input signal of the cell, and the equivalence check tool 10 may generate an analog input stimulus according to the input voltage limit of the input signal. The input voltage limit of the input signal may be the input HIGH threshold voltage Vih or the input LOW threshold voltage Vil. For the single-transistor circuit 50, when a logical constraint is used in the logic state model, an output pin OUT exhibits a logic "1" when feeding a logic "1" into an input pin IN of a transistor M1; whereas when an analog constraint is used in the real value model, an input stimulus is first converted to 6V using the input HIGH threshold voltage Vih and then fed into the input pin IN of the transistor M1 to generate 5V-VT at the output pin OUT, thereby reflecting the true value of the output signal in analog form. For the multi-driven circuit 52, when a logical constraint is used in the logic state model, an output pin OUT simply exhibits a logic "1" despite different analog voltage levels and/or different combinations of input signals being applied to an input pin IN1 and an input pin IN2 of transistors M1 and M2 in different circuit blocks, respectively. For example, the output pin OUT generates logic "1" for all the cases of inputting logic "1" into the pin IN1 and logic "1" into the input pin IN2, inputting logic "0" into the pin IN1 and logic "1" into the input pin IN2, and inputting logic "1" into the pin IN1 and logic "0" into the input pin IN2, a circuit designer cannot differentiate between the different cases despite that the three cases will exhibit different output behaviors in real life. When an analog constraint is adopted in the real value model, the transistor M1 may be input using an analog signal of 6V and the transistor M2 may be input using an analog signal of 7V, the output pin OUT can deliver 6V (a minimum output), 7V (a maximum output), 6.5V (an average output) or an "X" state (a conflicted output) depending on which one or both of the input pin IN1 and the input pin IN2 are applied with the analog signals, thereby accurately modeling the true output signal in analog form. For the multi-driven circuit 54, when a logical constraint is used in the logic state model, an output pin OUT simply exhibits a logic "1" despite different analog voltage levels and/or different combinations of input signals being applied to input pins IN1, IN2, IN3 of transistors M1, M2, M3, respectively; whereas when an analog constraint is adopted in the real value model, the transistor M1 may be input using an analog signal of 6V, the transistor M2 may be input using an analog signal of 7V and the transistor M3 may be input using an analog signal of 8V, the output pin OUT can deliver 6V, 7V, 8V or an "X" state depending on which of the input pins IN1, IN2, IN3 is applied with the analog signal, thereby accurately modeling the true output signal in analog form.

Figure 7:
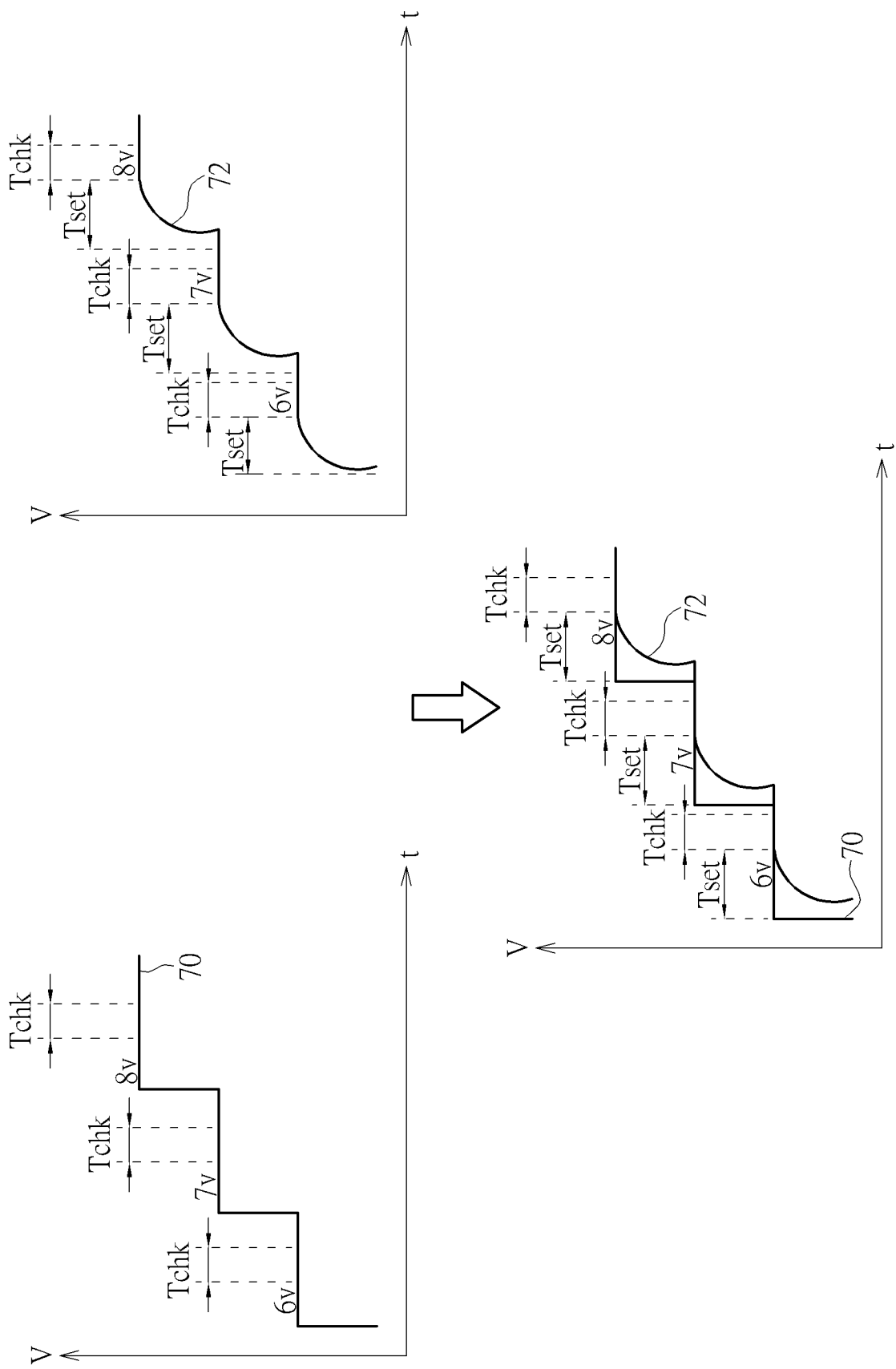
FIG. 7 shows an exemplary functional equivalence check for real value auto compare using a check window in the equivalence check system in FIG. 1.

FIG. 7 shows an exemplary functional equivalence check using a check window in the equivalence check system 1 for a real value model, where the top-left diagram illustrates a behavioral-level output signal 70, the top-right diagram illustrates a circuit-level output signal 72, and the bottom diagram shows a functional equivalence check of the behavioral-level output signal 70 and the circuit-level output signal 72. As discussed in the preceding paragraphs, the constraint of a cell in the cell list 12 may specify a check window of an output signal from an output pin of the cell, and the check window may be incorporated into the comparison of the behavioral-level output signal 70 and the circuit-level output signal 72 to take consideration of a settling time Tset of the circuit-level output signal 72. Unlike the behavioral-level simulation, the circuit-level output signal 72 takes a finite settling time Tset to settle into a stable state. As illustrated in FIG. 7, the circuit-level simulator 18 may skip the settling duration Tset and compare the behavioral-level output signal 70 and the circuit-level output signal 72 within the check window Tchk to obtain an accurate comparison result for the equivalence check. In some embodiments, the constraint of the cell may further specify a tolerance of the output signal of the cell in the check window. The tolerance may be a relative tolerance or an absolute tolerance. The circuit-level simulator 18 may determine whether a difference between the behavioral-level output signal 70 and the circuit-level output signal 72 is within the tolerance in the check window Tchk, if so, indicate in the comparison report 106 that a functional equivalence check of the output pin is successful, and if not, indicate in the comparison report 106 that a functional equivalence check of the output pin is failed. In the embodiment as shown in FIG. 7, the functional equivalence check is successful as the difference between the analog value of the behavioral-level output signal 70 and the analog value of the circuit-level output signal 72 are within the tolerance in the check window Tchk.

FIG. 6 shows another exemplary behavioral-level simulation result 1040 generated by the equivalence check system 1 for a real value model, employing a check window to check an analog value of an output signal from an output pin of a cell. The behavioral-level simulation result 1040 may contain both the input stimuli of all the input pins and the output value of all the output pins from the behavioral-level simulation, wherein the input stimuli contains full-coverage input combinations to be fed into input pins of cells for the circuit-level simulation, and the output value is captured according to the monitoring configuration file. The behavioral-level simulation result 1040 may contain a sig type parameter indicative of a signal type of a signal being logical or analog, with 1 indicating a logical value and r indicating an analog value. The line being selected indicates a check window setting of an analog value check for the output signal. The check window setting includes a check time, a window range, a steady state, a duration, a relative tolerance and an absolute tolerance. In the selected line, the check window has a check time centered at 500 ns and a window range of 50 ns preceding and 50 ns succeeding the check time. The behavioral-level simulator 16 may generate a simulated analog value as expected output, which will be compared with the circuit-level simulation analog output within the absolute tolerance of 10 mV or the relative tolerance of 10% in the check window and for a duration of 20 ns in circuit-level simulation. The output signal may be also checked for the "X" state and the "Z" state using the check window method outlined in FIG. 6.

FIG. 8 shows an exemplary behavioral-level simulation result 1040 generated by the equivalence check system 1 in the behavioral-level simulation for a logic state model, employing a check window to check a logic value of an output signal from an output pin of a cell. The check window constraint may define a window range, a check time and a steady state of the output signal. In FIG. 8, the selected line indicates a check window setting of a logic value check for the output signal. The behavioral-level simulator 16 may generate a simulated logic value as an expected output, which will be compared with the logic state output of the circuit-level simulation converted from analog output by the output HIGH threshold voltage voh and the output LOW threshold voltage vol in the check window, if the logic state output of the circuit-level simulation matches the expected output, indicate in the comparison report 106 that the logic value check of the output pin is successful, and otherwise, indicate in the comparison report 106 that the logic value check of the output pin is failed.

Figure 9:
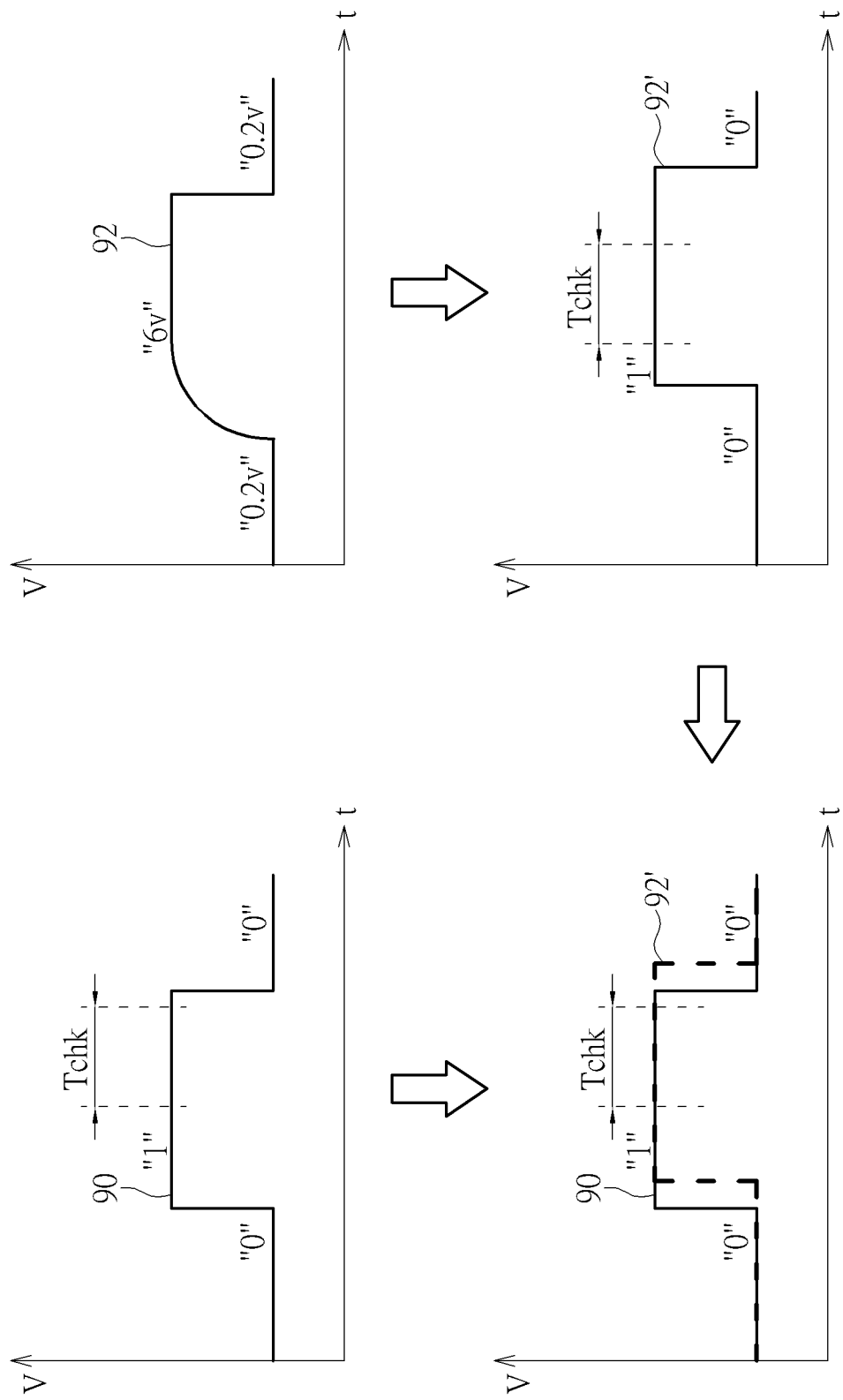
FIG. 9 shows an exemplary functional equivalence check for logic value auto compare using a check window according to an embodiment of the invention.

FIG. 9 shows an exemplary functional equivalence check using a check window in the equivalence check system 1 for a logic state model, where the top-left diagram illustrates a behavioral-level output signal 90, the top-right diagram illustrates a circuit-level output signal 92, the bottom-right diagram shows a digital conversion 92' of the circuit-level output signal 92, and the bottom left diagram shows a functional equivalence check of the behavioral-level output signal 90 and the converted circuit-level output signal 92'. The behavioral-level output signal 90 is a digital signal that may be at a logic level "0" or a logic level "1". The circuit-level output signal 92 is an analog signal that may ramp up from a first analog value such as 0.2V to a second analog value such as 6V, or vice versa. The circuit-level output signal 92 may be output to the behavioral-level simulator 16 and converted into the digitized circuit-level output signal 92' the output HIGH threshold voltage voh and the output LOW threshold voltage vol as specified in the monitoring configuration 1024. As a result, the digitized circuit-level output signal 92' may be at the logic level "0" or the logic level "1" and may be compared to the behavioral-level output signal 90. The value of the behavioral-level output signal 90 and the value of the digitized circuit-level output signal 92' may be compared in the check window Tchk. The behavioral-level simulator 16 may determine whether there is a difference between the behavioral-level output signal 90 and the value of the digitized circuit-level output signal 92' in the check window Tchk, if so, indicate in the comparison report 106 that a functional equivalence check of the output pin is failed, and if not, indicate in the comparison report 106 that a functional equivalence check of the output pin is successful. In the embodiment as shown in FIG. 9, the functional equivalence check is successful as the behavioral-level output signal 90 and the digitized circuit-level output signal 92' are both at the logic level "1" in the check window Tchk.

Figure 10:
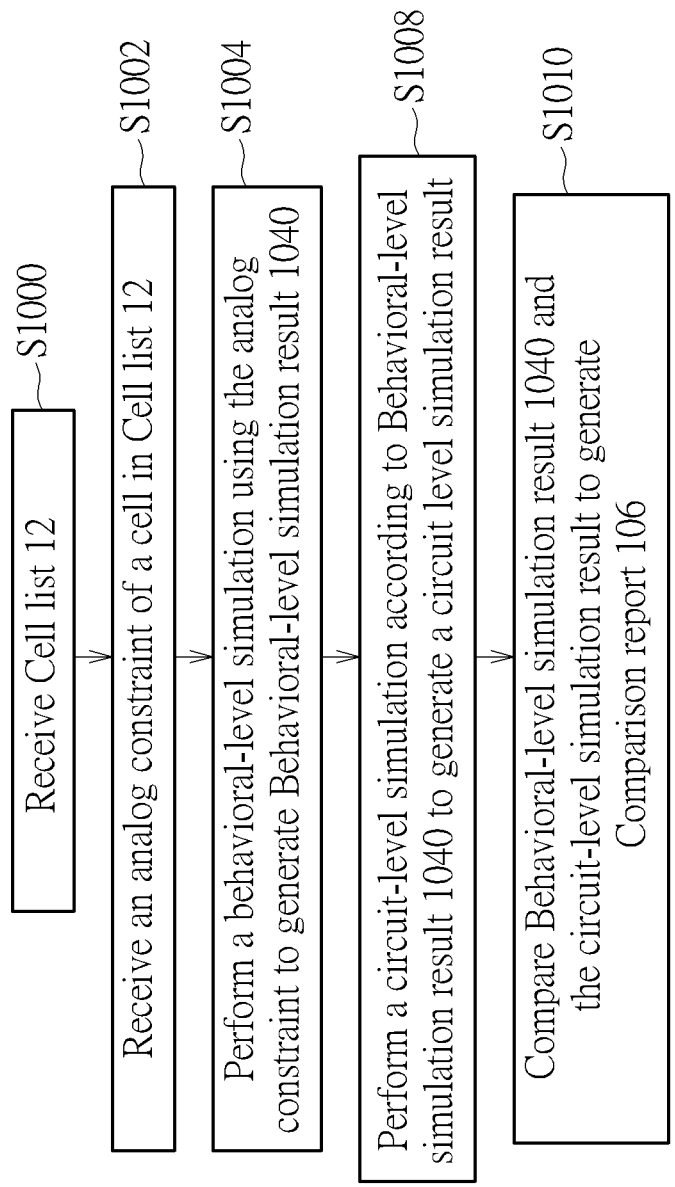
FIG. 10 is a flowchart of a function equivalence check method adopted by the equivalence check system in FIG. 1.

FIG. 10 is a flowchart of a function equivalence check method 10 adopted by the equivalence check system 1. The simulation method 10 comprises Steps S1000 through S1010 to perform an automatic functional equivalence check using analog values. Steps S1000 and S1002 are used to acquire an analog constraint of cells in the cell list 12. Steps S1004 through S1010 are used to acquire behavioral-level simulation result 1040 and the circuit-level simulation result using the analog constraint and automatically compare the behavioral-level simulation result 1040 and the circuit-level simulation result to generate the comparison report 106. Any reasonable technological change or step adjustment is within the scope of the disclosure. Steps S1000 through S1010 are detailed as below:

Step S1000: Receive Cell list 12;
Step S1002: Receive an analog constraint of a cell in Cell list 12;
Step S1004: Perform a behavioral-level simulation using the analog constraint to generate Behavioral-level simulation result 1040;
Step S1008: Perform a circuit-level simulation according to behavioral-level simulation result 1040 to generate a circuit-level simulation result;
Step S1010: Compare Behavioral-level simulation result 1040 and the circuit-level simulation result to generate Comparison report 106.

Details of Steps S1000 through S1010 are explained in the preceding paragraphs and will not be repeated here.

Figure 11:
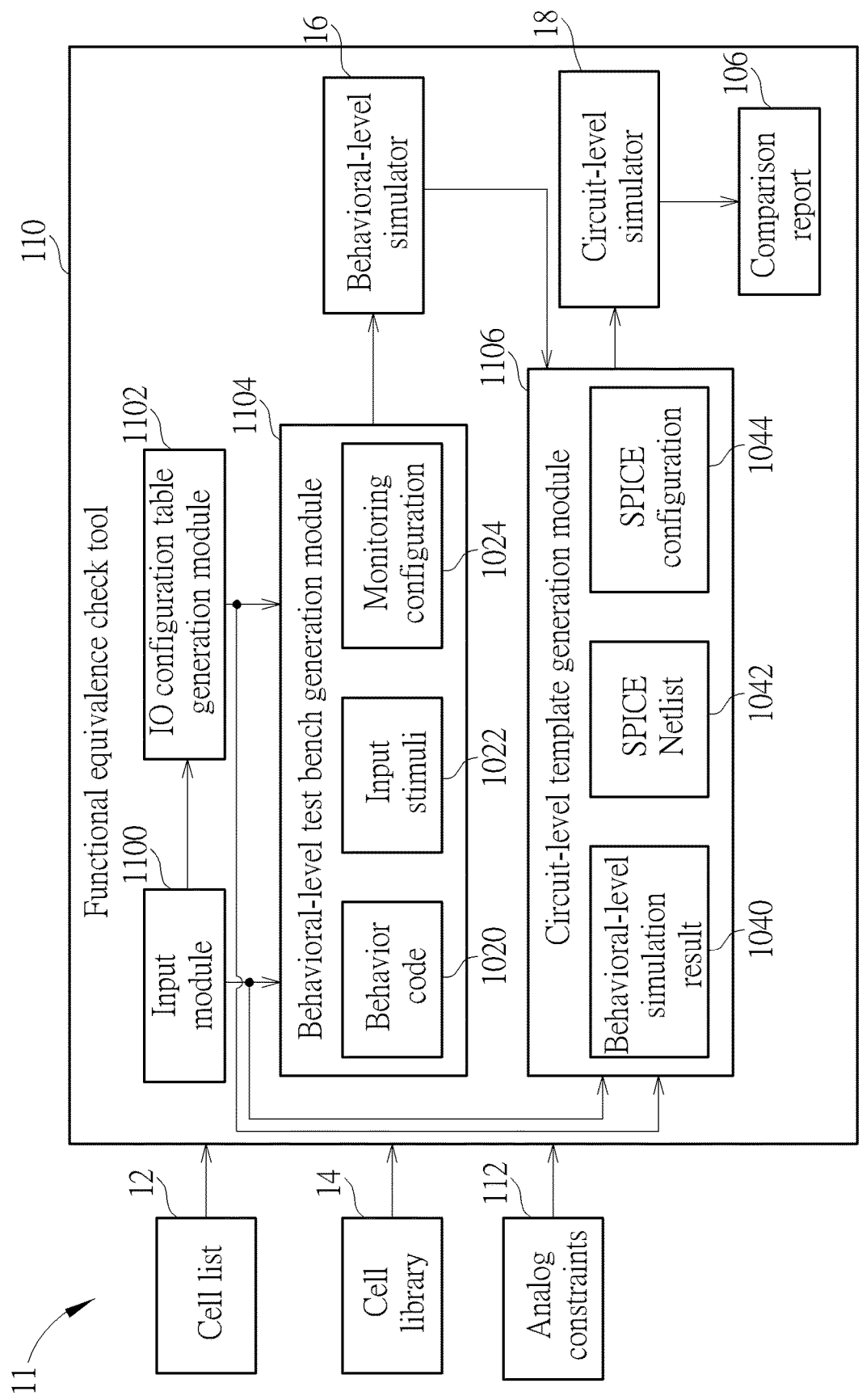
FIG. 11 is a schematic diagram of a computer program for use to perform a function equivalence check using an analog constraint according to an embodiment of the invention.

FIG. 11 is a schematic diagram of a computer program 11 for use to perform a function equivalence check using an analog constraint according to an embodiment of the invention. The computer program 11 may be executable by a processor in a computer and stored in a non-transitory computer-readable storage medium in the computer. The non-transitory computer-readable storage medium may be a hard disk drive, an optical disc, random-access memory, read-only memory or another non-volatile memory.

The computer program 11 comprises functional equivalence check tool 110 including an input module 1100, an IO configuration table generation module 1102, a behavioral-level test bench generation module 1104, a circuit-level template generation module 1106, the behavioral-level simulator 16, and the circuit-level simulator 18.

The input module 1100 may receive a cell list 12 and analog constraints 112 of a cell in the cell list 12. The IO configuration table generation module 1102 may generate an IO configuration table 100 according to the cell list 12 and modify the IO configuration table 100 using the analog constraints 112. The analog constraints 112 may comprise an IO type, a port type, a real voltage, an input HIGH threshold voltage Vih, an input LOW threshold voltage Vil, a forced input, a restrictive input, priority, a cycle, an unused pin and a power pin for an input pin of the cell in the cell list 12; an IO type, a port type, a real voltage, an unused pin, an output load, a "Z" state check, an "X" state check and simulation accuracy for an output pin of the cell in the cell list 12.

In some embodiments, the behavioral-level test bench generation module 1104 may generate the analog input stimulus 1022 according to the modified IO configuration table 100. The behavioral-level test bench generation module 1104 may generate a behavior code 1020 according to the cell list 12, and generates a monitoring configuration 1024 according to the modified IO configuration table 100. The behavioral-level simulator 16 may perform a behavioral-level simulation using the analog input stimulus 1022 to generate an analog output response as the behavioral-level simulation result 1040. Specifically, the behavioral-level simulator may apply the input stimulus 1022 to the cell modelled by the behaviour code 1020 to capture an output signal from an output pin specified in the monitor configuration 1024.

The circuit-level template generation module 1106 may receive the behavioral-level simulation result 1040 from the behavioral-level simulator 16, generate the SPICE netlist 1042 according to the cell list 12, generate a circuit-level simulation configuration 1044 according to the modified IO configuration table 100. The circuit-level simulator 18 may perform a circuit-level simulation according to the SPICE netlist 1042 and the circuit-level simulation configuration 1044 to generate a circuit-level simulation result, and compare the behavioral-level simulation result 1040 and the circuit-level simulation result to generate a comparison report 106.

Operations of the behavioral-level simulator 16 and circuit-level simulator 18 are explained in the preceding paragraphs and will not be repeated here.

The equivalence check tool 10 in FIG. 1, the simulation method 4 in FIG. 4, the function equivalence check method 10 in FIG. 10 and the computer program 11 in FIG. 11 can automate a functional equivalence check process, provide full-coverage of input stimuli, take actual values of a circuit designs into consideration in a behavioral-level modeling and simulation, and perform the an analog value auto-comparison between behavioral-level simulation result 1040 and the circuit-level simulation result to generate a comparison report 106.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A function equivalence check method comprising:
receiving a cell list;
receiving an analog constraint of a cell in the cell list;

performing a behavioral-level simulation using the analog constraint to generate a behavioral-level simulation result;
performing a circuit-level simulation according to the behavioral-level simulation result to generate a circuit-level simulation result; and
comparing the behavioral-level simulation result and the circuit-level simulation result to generate a comparison report.

2. The method of claim 1, wherein:
the analog constraint comprises an input/output (IO) type, a port type, a real voltage, an input HIGH threshold voltage, an input LOW threshold voltage, a forced input, a restrictive input, priority, a cycle, an unused pin and a power pin for an input pin of the cell in the cell list, or an IO type, a port type, a real voltage, an unused pin, an output load, and alterations of an IO type for an output pin of the cell in the cell list; and
performing the behavioral-level simulation using the analog constraint comprises:
generating an analog input stimulus according to the analog constraint; and
performing the behavioral-level simulation using the analog input stimulus to generate an analog output response as the behavioral-level simulation result.

3. The method of claim 1, further comprising:
generating an IO configuration table according to the cell list; and
modifying the IO configuration table using the analog constraint;
wherein performing the behavioral-level simulation using the analog constraint comprises:
generating full-coverage analog input stimuli according to the modified IO configuration table; and
performing the behavioral-level simulation using the full-coverage analog input stimuli to generate an analog output response as the behavioral-level simulation result.

4. The method of claim 3, further comprising:
generating behavioral code according to the cell list; and
generating a monitoring configuration according to the modified IO configuration table;
wherein performing the behavioral-level simulation using the full-coverage analog input stimuli to generate the analog output response as the behavioral-level simulation result comprises:
applying the full-coverage analog input stimuli to a cell modelled by the behavioral code to capture an output signal from an output pin specified in the monitor configuration.

5. The method of claim 3, further comprising:
generating a circuit-level simulation configuration according to the modified IO configuration table;
wherein performing the circuit-level simulation comprises:
performing the circuit-level simulation according to the circuit-level netlist and the circuit-level simulation configuration to generate the circuit-level simulation result.

6. The method of claim 1, wherein:
the analog constraint of the cell specifies a check window of an output signal from an output pin of the cell; and
comparing the behavioral-level simulation result and the circuit-level simulation result to generate the comparison report comprises:

comparing the behavioral-level simulation result and the circuit-level simulation result in the check window.

7. The method of claim 1, wherein:
the analog constraint of the cell specifies a tolerance of an output signal of the cell in a check window;
the output signal is output from an output pin of the cell; and
comparing the behavioral-level simulation result and the circuit-level simulation result to generate the comparison report comprises:
determining a difference between the output signal in the behavioral-level simulation result and the output signal in the circuit-level simulation result in the check window; and
indicating in the comparison report that a functional equivalence check of the output pin is successful when the difference is less than the tolerance.

8. The method of claim 7, wherein the tolerance is a relative tolerance.

9. The method of claim 7, wherein the tolerance is an absolute tolerance.

10. The method of claim 1, further comprising receiving a second constraint of the cell in the cell list;
wherein the second constraint of the cell specifies that an output signal from an output pin of the cell is floating; and
comparing the behavioral-level simulation result and the circuit-level simulation result to generate the comparison report comprises:
indicating in the comparison report that a functional equivalence check of the output pin is successful when the output signal in the behavioral-level simulation result and the output signal in the circuit-level simulation result are both floating.

11. The method of claim 1, further comprising receiving a second constraint of the cell in the cell list;
wherein the second constraint of the cell specifies that an output signal from an output pin of the cell is driven by multiple signal sources; and
comparing the behavioral-level simulation result and the circuit-level simulation result to generate the comparison report comprises:
indicating in the comparison report that a functional equivalence check of the output pin is successful when the output signal in the behavioral-level simulation result and the output signal in the circuit-level simulation result are both driven by multiple signal sources.

12. An apparatus for an equivalence check, comprising:
an input module configured to receive a cell list and an analog constraint of a cell in the cell list;
a behavioral-level simulator, coupled to the input module, and configured to perform a behavioral-level simulation using the analog constraint to generate a behavioral-level simulation result; and
a circuit-level simulator, coupled to the behavioral-level simulator, and configured to perform a circuit-level simulation according to the behavioral-level simulation result to generate a circuit-level simulation result, and compare the behavioral-level simulation result and the circuit-level simulation result to generate a comparison report.

13. The apparatus of claim 12, wherein:
the analog constraint is an IO type, a port type, a real voltage, an input HIGH threshold voltage, an input LOW threshold voltage, a forced input, a restrictive input, priority, a cycle, an unused pin and a power pin for an input pin of the cell in the cell list, or an IO type, a port type, a real voltage, an unused pin, an output load, and alterations of an IO type for an output pin of the cell in the cell list;

the apparatus further comprises a behavioral-level test bench generation module, coupled to the input module and the circuit-level simulator, and configured to generate an analog input stimulus according to the analog constraint; and the behavioral-level simulator is configured to perform the behavioral-level simulation using the analog input stimulus to generate an analog output response as the behavioral-level simulation result.

14. The apparatus of claim 13, wherein:

the apparatus further comprises an input/output (IO) configuration table generation module, coupled to the input module, and configured to generate an IO configuration table according to the cell list and modifying the IO configuration table using the analog constraint;

the behavioral-level test bench generation module is configured to generate full-coverage analog input stimuli according to the modified IO configuration table; and the behavioral-level simulator is configured to perform the behavioral-level simulation using the full-coverage analog input stimuli to generate an analog output response as the behavioral-level simulation result.

15. The apparatus of claim 14, wherein:

the behavioral-level test bench generation module is configured to generate behavioral code according to the cell list, and generate a monitoring configuration according to the modified IO configuration table; and the behavioral-level simulator is configured to apply the full-coverage input stimuli to the cell modelled by the behavioral code to capture an output signal from an output pin specified in the monitor configuration.

16. The apparatus of claim 14, wherein:

the circuit-level template generation module is further configured to generate a circuit-level simulation configuration according to the modified IO configuration table; and the circuit-level simulator is configured to perform the circuit-level simulation according to the circuit-level netlist and the circuit-level simulation configuration to generate the circuit-level simulation result.

17. The apparatus of claim 12, wherein:

the analog constraint of the cell specifies a check window of an output signal from an output pin of the cell; and the circuit-level simulator is configured to compare the behavioral-level simulation result and the circuit-level simulation result in the check window.

18. The apparatus of claim 12, wherein:

the analog constraint of the cell specifies a tolerance of an output signal of the cell in a check window;

the output signal is output from an output pin of the cell; and the circuit-level simulator is configured to determine a difference between the output signal in the behavioral-level simulation result and the output signal in the circuit-level simulation result in the check window, and indicate in the comparison report that a functional equivalence check of the output pin is successful when the difference is less than the tolerance.

19. The apparatus of claim 12, wherein:

the input module is further configured to receive a second constraint of the cell in the cell list, the second constraint of the cell specifying that an output signal from an output pin of the cell is floating; and the circuit-level simulator is configured to indicate in the comparison report that a functional equivalence check of the output pin is successful when the output signal in the behavioral-level simulation result and the output signal in the circuit-level simulation result are both floating.

20. The apparatus of claim 12, wherein;

the input module is further configured to receive a second constraint of the cell in the cell list, the second constraint of the cell specifying that an output signal from an output pin of the cell is driven by multiple signal sources; and the circuit-level simulator is configured to indicate in the comparison report that a functional equivalence check of the output pin is successful when the output signal in the behavioral-level simulation result and the output signal the circuit-level simulation result are both driven by multiple signal sources.

* * * * *